United States Patent [19]

Broodman

[11] 4,363,435

[45] Dec. 14, 1982

[54] METHOD FOR PRODUCING A TUBE FOR A CRACKING PLANT

[75] Inventor: Johannus J. Broodman, Breskens, Netherlands

[73] Assignee: B.V. Koninklijke Maatschappij "De Schelde", Vlissingen, Netherlands

[21] Appl. No.: 126,205

[22] Filed: Mar. 3, 1980

[30] Foreign Application Priority Data

Mar. 2, 1979 [NL] Netherlands ............... 7901691

[51] Int. Cl.³ ............................................. B23K 20/14
[52] U.S. Cl. ............................... 228/131; 228/219; 228/221; 228/234; 228/243; 228/265
[58] Field of Search .............. 228/126, 127, 131, 193, 228/234, 242, 243, 265, 219, 221

[56] References Cited

U.S. PATENT DOCUMENTS

| | | |
|---|---|---|
| 2,975,259 | 3/1961 | Osborn .......................... 228/273 X |
| 3,316,630 | 5/1967 | Goedecke et al. ............. 228/212 X |
| 3,397,445 | 8/1968 | Ulmer et al. ................... 228/234 X |
| 3,408,728 | 11/1968 | Fickett et al. .................. 228/243 X |
| 3,862,489 | 1/1975 | Weisinger ...................... 228/193 X |

FOREIGN PATENT DOCUMENTS 437812 11/1926 Fed. Rep. of Germany .
694423 9/1930 France .

Primary Examiner—Gus T. Hampilos
Attorney, Agent, or Firm—Bucknam and Archer

[57] ABSTRACT

Method for making a tube for a cracking plant, by providing an inner tube, placing a reinforcement about said inner tube, said reinforcement having transverse openings or passages, placing an outer tube coaxially about said inner tube and said reinforcement, bonding together by pressure or fusion welding, said inner tube and said outer tube through said openings or passages in said reinforcement.

8 Claims, 2 Drawing Figures

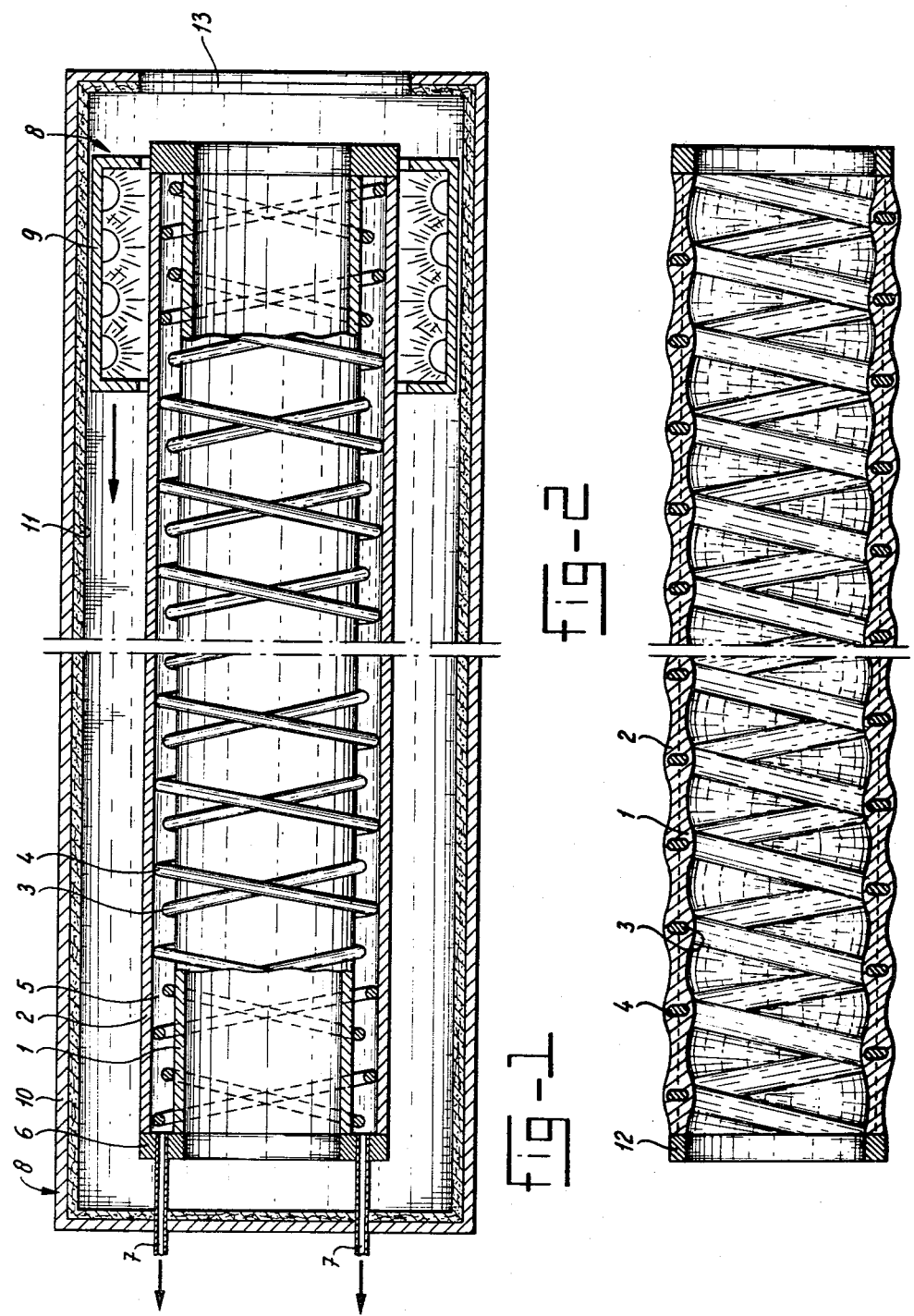

METHOD FOR PRODUCING A TUBE FOR A CRACKING PLANT

The invention relates to a method for producing a tube for a cracking plant.

The preparation of ethylene from naphtha pyrolysis at a very high temperature is an important process which enables to cope with the increasing demand for ethylene.

This process is performed in tubular furnaces, so called cracking furnaces, in which a feed of saturated hydrocarbons, naptha in case of ethylene, blended with steam is led through horizontally or vertically mounted tubes which are externally heated to a very high temperature by means of gas burners or oil burners. The endothermic cracking reaction occurs mainly in the radiation zone within the tubes at which the highest temperature prevails, that is in the course of a retention time of some seconds to some tenths of a second depending on the installation employed. The hydrocarbon-steam mixture is heated at a pressure of about 200 kPa and to a temperature of about 900° C. Subsequently the gaseous cracking effluent is forcibly quenched.

The recent known processes already have reached a high degree of perfection so that any increase in the yield of ethylene is solely possible by increasing the cracking temperature and reducing the retention time.

It has become possible to reach the above mentioned temperature of 900° C. by using highly alloyed nickel, for instance 25-20 CrNi. The maximum tube wall temperature amounts to about 1050° C. at a temperature in the combustion chamber of about 1200° C.

Up till now however higher temperatures of the cracking gas are not feasible because the nickel alloys cannot withstand anymore the pressure of the cracking gas in the interior of the tube at higher temperatures.

The investigated use of ceramic material for the tubes did not lead to the desired result mainly because the ceramic tubes are also insufficiently capable of withstanding high pressure.

The object of the present invention is to provide a method for producing a tube for a cracking plant which may be operated at much higher tube wall temperatures and higher pressures than methods possible at present. When using this kind of tube the yield of ethylene may be increased considerably. It goes without saying, that the tubes produced by this method are not restricted to use in the ethylene production.

The method according to the present invention consists of providing an inner tube consisting of a material capable of withstanding an excessive interior medium and an excessive internal temperature within the inner tube; placing a reinforcement about the inner tube, the reinforcement being provided with a plurality of openings, holes or passages arranged between the reinforcement parts and consisting of a material capable of withstanding excessive compressive and tensile forces acting on the tube; placing an outer tube about the reinforcement, the outer tube consisting of a material capable of withstanding both an excessive medium and an excessive temperature that may prevail at the outside of the outer tube; exerting a pressure of such a magnitude on the inner surface of the inner tube and on the outer surface of the outer tube in a pressure furnace and heating these tubes to such a high temperature that the limit of stretching strain of the tube material is surpassed whereby the two tubes are bonded together by pressure or fusion welding the openings or passages between the reinforcement parts.

It is preferred to create vacuum conditions within the gap between the inner and the outer tube upon exerting said pressure. In case the inner or outer tube consists of nickel or a nickel alloy and the reinforcement consists of molybdenum there will be exerted a pressure on the tubes from about 4500 to about 5000 kPa while heating the tubes to about 1300° C. for attaining fusion welds or pressure welds.

The reinforcement may be comprised of a netting or a braiding of wires, a braided mantle, though it may also be comprised of wires wound helically in opposite directions about the tube. There may also be wound a single winding on a plurality of parallel longitudinal axially extending wires placed on the inner tube. This reinforcement may also consist of a tube of suitable material, for instance sheet material slid into the inner tube, which tube has been provided with a large number of openings or passages for instance by punching or cutting. A requirement is that there should be a sufficient number of openings enabling the formation of a firm bond between the inner and the outer tube upon fusion welding under pressure and at high temperature.

Close to the end faces the reinforcement may be omitted over a short distance from the end face so that at this location where two tubes have been bonded together an end face surface is obtained solely consisting of the material of the two coaxial tubes.

Preferably the material of both the inner and the outer tube consists of nickel or a nickel alloy such as Inconel 601 that is a nickel based alloy containing chromium in addition to nickel which materials are capable of withstanding the desired high cracking temperature. The material is however not restricted to these particular substances. There may be used also for instance cobalt alloys, in general materials capable of withstanding the said high temperature and the pertaining medium.

In view of the strength thereof molybdenum and alloys thereof are suited in particular for the reinforcement. Under the influence of oxygen this material if unprotected would be subject to immediate oxidation at the high temperature. This reinforcement is however completely embedded by the surrounding tubes of nickel or alloys thereof and consequently very effectively protected against the surrounding medium. At the same time the reinforcement imparts the necessary firmness to the tubes for withstanding the process pressure as well as a sufficient strength in the longitudinal direction of the tube.

Instead of molybdenum one may however also use other suitable materials such as tungsten, tantalum or alloys thereof.

The fusion bond between the two coaxial tubes within the openings between the reinforcement parts of course provides for the necessary good heat transfer from the exterior of the tubes where contacting the combustion gases, to the interior thereof containing the steam and/or the cracking gas. The fusion bond also provides for a good sealing in axial direction of a leakage would occur in one of the tube walls.

Upon using the inventive tubes made of nickel alloys and molybdenum cracking gas temperatures may be reached upto about 1300° C. at a pressure of 300 kPa (3 atmosphere) or higher. This much higher temperature than the one maximally feasible up till now, i.e. 900° C., causes a very high increase of the efficiency, that is to say a much higher yield of ethylene at the same amount of natural gas burnt.

Upon pressurizing the composite tube is simultaneously heated to a temperature of about 1300° C. Such heating may be performed along the entire length of the tube but also within a short heating furnace surrounding the tube over part of its length through which furnace the tube is passed in the longitudinal direction thereof or which furnace is passed in longitudinal direction along the tube.

When the tube reaches the said high furnace temperature the limit of stretching strain of the tube material is surpassed so that two coaxial tubes under the above mentioned high pressure and the desired vacuum within the gas are forced towards each other in such a degree that the material of the tubes is forced into the openings between the parts of wires of the reinforcement and is bonded together at these locations by pressure or fusion welding. The parts or wires of the reinforcement are embadded completely on all sides within the material of the coaxial tubes so that the material of the reinforcement is completely protected against the exterior and the interior media of the tubes whereas the wires may neither be shifted or moved anymore.

It goes without saying that the material of the reinforcement should be of such a nature that the reinforcement maintains its shape at the high temperature of the limit of stretching strain of the material of the tubes.

The invention will now be elucidated in detail with reference to the drawing representing an embodiment of a tube according to the invention.

FIG. 1 represents a first step in the fabrication showing a tube according to the invention partially in cross section prior to exerting pressure and heating before the inner and the outer tube have been bonded together;

FIG. 2 represents a tube fabricated by the method of the present invention in cross section after fusion welding of the inner tube to the outer tube and the application of a sealing ring to the end face by weld coating. This tube has been rotated over 90° around the axis with respect to the tube in FIG. 1.

With reference to FIG. 1 there has been shown one end of a tube according to the invention of which the left hand part in the figure has been drawn entirely in cross section, that is to say through both the coaxial tubes. The middle part shows solely the outer tube in cross section whereas the right hand part represents the outer tube in side elevation.

In the represented instance of this example the inner tube 1 preferably consisting of nickel or a nickel alloy has been provided with a reinforcement, comprising two molybdenum wires 3 and 4 firmly wound helically and cross wise in opposite directions. In the left hand part of FIG. 1 the wires 3 and 4 are also shown in cross section, the full drawn lines representing the courses of these wires at the back side of the inner tube 1. The middle part shows the interior of the inner tube 1 as well as the molybdenum wires 3 and 4 wound cross wise about this tube.

The outer tube 2, preferably in a close fitting manner, is slid over this wire reinforcement until the end faces of the two tubes have reached the coplanar position in the left hand part of the drawing, and in the not shown right hand part as well. The tube 2 should be slid in a so closely fitting or slidingly fitting manner over the molybdenum wires 3 and 4 that there will yet remain a sufficient number of axial passages for enabling the evacuation of the entire gap 5 along the entire length of the tube.

The thus formed combination of tubes 1 and 2 and wires 3 and 4 is then introduced into a gas pressure chamber-furnace combination 8. This pressure-furnace combination 8 may include a thermally insulated tight pressure wall 10 having a heat insulation 11 which furnace combination surrounds the tubes to be welded entirely and has been filled preferably with an inert gas. This pressure furnace combination 8 is depicted in FIG. 1 diagrammatically only. The furnace is heated by means of radiation elements in a tubular section 9. The required pressure is achieved by increasing the pressure of the inert filling gas.

The extremities of the tubes 1 and 2 giving excess to the initial inner gap 5 may be sealed off provisionally for instance by welding or by means of rings 6 in which there have been provided suction openings for tubes 7 for evacuating the gap. The tubes 7 communicate with the said inner gap 5 and lead to one or more not shown vacuum pumps which have been arranged outside the pressure chamber furnace combination 8.

The operative furnace part may be in the shape of a ring or a short tubular section 9 projecting from the pressure wall and also arranged coaxially about the tubular combination like the pressure wall.

The tubular section 9 may then be moved lengthwise through the pressure furnace 10, 8, from the right furnace end to the left furnace end in the direction of the arrow.

After introducing the tubular combination into the pressure chamber and closing gate 13 vacuum conditions are created in the inner gap 5. In case the tubes consist of nickel or a nickel alloy and the reinforcement consists of molybdenum wires 3 and 4 the pressure in the pressure chamber is then increased until a pressure of from 4500 to 5000 kPa (45–50 atmospheres) is exerted on the inner surface of the inner tube 1 and on the outer surface of the outer tube 2. Preferably the vacuum conditions in the inner gap 5 are maintained upon exerting the pressure. In the furnace 8, 10 the tubular combination is heated to a temperature of about 1300° C. also when using nickel or a nickel alloy for the tubes. At the location where this temperature is reached the pressure exerted on the tubes 1 and 2 and the vacuum conditions between the tubes 1 and 2 will then force the tubes towards each other upon surpassing the limit of stretching strain of the tube material whereby first the evacuated axial gap between the wires 3 and 4 is filled. The pressure and the temperature should finally be increased to such a value that the material of the tube 1 and of the tube 2 is subject to a complete fusion in the said gap between the wires, that is to say that there will be generated a fusion weld of excellent quality between the tubes 1 and 2 while completely embedding the wires 3 and 4.

As remarked above, the tubular combination may be moved in its longitudinal direction through the pressure furnace although the furnace may likewise be moved in case of a stationary tube. In such case the fusion welding may be preferred stepwise, that is to say each time parts of the tube will be welded corresponding to the length of the shorter heating section of the pressure furnace.

In FIG. 1 there has been represented an embodiment in which, as stated above, two uninterrupted wires 3 and 4 have been wound crosswise on and around the inner tube 1. It will be evident however that the invention is not restricted to this embodiment. Instead of two wires one may use more wires which may for instance be wound between one another. The winding pitch does not have to be constant everywhere and may for instance be chosen smaller at higher temperature locations.

Likewise there may first be placed several parallel wires on the inner tube 1 in the longitudinal axial tube direction on which one or more wires are then wound helically.

When choosing the wall thickness of the tubes 1 and 2 one will of course have to take in account that there will remain yet a sufficient rest wall thickness between the exterior tube surface and the wires also at the locations where two wires 3 and 4 intersect each other and rest upon each other and that these wires also remain completely embedded on all sides.

The invention is not restricted either to wires having a round cross section. Instead of wires one may use bands or stripes or even a relatively wide meshed woven tubular netting. Likewise use may be made of a tubular reinforcement of sheet material having a large number of openings distributed over the entire reinforcement through which the material of the tubes 1 and 2 may fuse together.

From the partial cross section of a tube according to the invention as shown in FIG. 2 it is apparent that the completed tube possesses a corrugated outer surface this being the result of the movement of the tube material towards each other between the wires 3 and 4. The interrupted line drawn at the location of the imaginary cylinder plane of the wires 3 indicate the position where the two tubes 1 and 2 have been bonded together. This line however is only an imaginary line because in practice the fusion is so complete that no material transition may be observed.

The end faces of the pipe sections bonded together may be covered by a ring 12 which is preferably obtained by building up welding. This ring may be constituted by the ring 6 represented in FIG. 1 and will preferably be composed of the same material as the material of the tubes 1 and 2.

As a cracking plant in which the tubes according to the present invention are used there may be conceived an arrangement including uninterrupted tubes having a length of 10-20 m and an outer diameter of 130 mm in which the likewise uninterrupted reinforcement has been provided as a single fabrication step. It will be evident however that likewise tubes of different sizes may be produced and used in cracking plants. Since tubes having a large diameter and small wall thicknesses may be produced in accordance with the invention the benefit of a smaller temperature differential over the wall as well as the possibility to apply higher heat current densities is achieved. The slight temperature differential across the wall moreover leads to an increase of the maximally feasible process temperature of the medium within the tube. The possibility of using tubes of a sufficient strength and having a large diameter has a favourable effect on the heating surface extension to be installed.

It is self evident that the invention is not restricted to the fabrication method as represented end discussed above and that modifications and amplifications may be made without leaving the scope of the invention.

I claim:

1. A method for producing a tube for a cracking plant which comprises the steps of providing an inner tube consisting of a material capable of withstanding an excessive interior pressure and an excessive internal temperature within the inner tube; placing a reinforcement about said inner tube, said reinforcement being provided with a plurality of openings, holes or passages arranged between the reinforcement parts and consisting of a material capable of withstanding excessive compressive and tensile forces acting on the tube; placing an outer tube about said reinforcement, said outer tube consisting of a material capable of withstanding both an excessive pressure and an excessive temperature that may prevail outside the outer tube; exerting a pressure of such a magnitude on the inner surface of the inner and on the outer surface of the outer tube in a pressure furnace and furthermore heating these tubes to such a high temperature that the limit of stretching strain of the tube materials is surpassed, whereby the two tubes are bonded together by pressure or fusion welding in the openings or passages between the reinforcement parts.

2. The method of claim 1 wherein vacuum conditions are created within the gap between the inner and the outer tube upon exerting said pressure.

3. The method of anyone of claims 1 and 2 wherein the inner tube and the outer tube consists of nickel or a nickel alloy; the reinforcement consists of molybdenum wire; and for fusion welding the two tubes a pressure of from about 4500 to about 5000 kPa is exerted on the tubes and the tubes are heated to a temperature of about 1300° C.

4. The method of claim 1, wherein the reinforcement is placed by winding several wires crosswise against each other about the inner tube.

5. The method of claim 1, wherein the reinforcement is placed by first arranging several wires parallel to each other on the inner tube in the longitudinal axial tube direction and subsequently winding one or more wires in a helical manner of vice versa.

6. The method of claim 1, wherein the end faces of the inner and outer tubes are capped by means of a ring of the same material as that of the tubes, after bonding together the tubes by fusion welding.

7. The method of claim 6 wherein the ring is applied by building up welding.

8. A method of manufacturing a tube for cracking reactions at temperature over 900° C. and pressures in excess of 200 kPa, which comprises the steps of:

(1) mounting a reinforcement around an inner tube, said inner tube being made of a material capable of withstanding a pressure above 200 kPa and a temperature of 1300° C., said reinforcement comprising a plurality of openings and being made of a material capable of withstanding high compressive and tensile forces, (2) placing an outer tube in telescoping arrangement over said reinforcement and said inner tube so as to leave a gap along the entire length of said inner and outer tube, said outer tube being made of a material capable of withstanding both an excessive pressure and excessive temperature, (3) heating said assembly from step (2) to such a high temperature and while applying pressure that the limit of stretching strain of the tube materials is surpassed, (4) applying vacuum to said gap, (5) fusion welding said inner tube and said outer tube while said gas is under vacuum, whereby said reinforcement is completely embedded in said inner and outer tube and a corrugated outer surface is obtained.

* * * * *